United States Patent [19]

Shearer

[11] Patent Number: 5,694,462
[45] Date of Patent: Dec. 2, 1997

[54] CALL FORWARDING STATUS MONITOR

[76] Inventor: Kyl E. Shearer, 2051 Willet Dr., Billings, Mont. 59105

[21] Appl. No.: 610,878

[22] Filed: Mar. 5, 1996

[51] Int. Cl.⁶ .................................................. H04M 1/56
[52] U.S. Cl. ...................... 379/211; 379/354; 379/396; 379/140
[58] Field of Search .................... 379/130, 131, 379/140, 141, 201, 211, 354, 396

[56] References Cited

U.S. PATENT DOCUMENTS

| | | | |
|---|---|---|---|
| 3,551,605 | 12/1970 | Icenbice, Jr. | 379/353 |
| 5,077,789 | 12/1991 | Clark, Jr. et al. | 379/201 |
| 5,172,406 | 12/1992 | Locke | 379/88 |
| 5,249,221 | 9/1993 | Ketring | 379/214 |
| 5,278,895 | 1/1994 | Carlson | 379/67 |
| 5,280,523 | 1/1994 | Lee | 379/376 |
| 5,291,547 | 3/1994 | Boatwright et al. | 379/113 |
| 5,359,651 | 10/1994 | Dragonoff | 379/354 |
| 5,369,686 | 11/1994 | Dutra et al. | 379/94 |
| 5,416,834 | 5/1995 | Bales et al. | 379/211 |
| 5,432,844 | 7/1995 | Core et al. | 379/67 |

FOREIGN PATENT DOCUMENTS

| | | |
|---|---|---|
| 3014440 | 10/1981 | Germany . |
| 56-73954 | 6/1981 | Japan . |
| 57-53175 | 3/1982 | Japan . |
| 2-243042 | 9/1990 | Japan . |
| 3-70386 | 3/1991 | Japan . |
| 80/02094 | 10/1980 | WIPO . |

*Primary Examiner*—Krista Zele
*Assistant Examiner*—Daniel S. Hunter
*Attorney, Agent, or Firm*—Richard C. Litman

[57] ABSTRACT

A call forwarding status monitor for acknowledging the properly dialed DTMF or touch tone keypad indicating that a telephone line has been forwarded to another telephone number. The monitor connects to an available modular telephone jack at the subscribers location and registers the dialed numbers. Once the proper activation (or de-activation) sequence has been dialed, the monitor will provide a positive indication that the call has been forwarded. The indication is in the form of a visible light and/or an alphanumeric display in order to positively verify that the proper number has been entered.

3 Claims, 6 Drawing Sheets

CALL FORWARDING STATUS MONITOR

BACKGROUND OF THE INVENTION

1. Field of the Invention

The present invention relates to a call forwarding status monitor for positive acknowledgement that a telephone line had been forwarded.

2. Description of the Prior Art

The prior art has not been able to provide a call forwarding status monitor suitable to satisfy economic needs and maintain accuracy in performing the monitoring functions. For example, U.S. Pat. No. 3,551,605, issued Dec. 29, 1970, to Icenbice, Jr., discloses a system for handling telephone calls by an operator; this system provides a display of an operator dialed number for verification before proceeding with the call. U.S. Pat. No. 5,249,221, issued Sep. 18, 1993, to Ketring, discloses a system that monitors the status of a call forwarded from the telephone company. U.S. Pat. No. 5,416,834, issued May 16, 1995, to Bales et al. discloses a system that identifies the type of incoming telephone call and makes the appropriate forwarding regardless of the initial number dialed. U.S. Pat. No. 5,172,406, issued Dec. 15, 1992, to Locke, discloses a system detecting and identifying dial tone signals and preventing talk-off. U.S. Pat. No. 5,359,651, issued Oct. 25, 1994, to Draganoff, discloses a telephone dialer having a directory and display for fast access of stored numbers. U.S. Pat. No. 5,278,895, issued Jan. 11, 1994, to Carlson, discloses a voice messaging system for pay phones that interconnects the pay phone call to the appropriate substation. U.S. Pat. No. 5,280,523, issued Jan. 18, 1994, to Lee, discloses a visible indication that a telephone is ringing. U.S. Pat. No. 5,291,547, issued Mar. 1, 1994, to Boatwright et al., discloses a monitoring system for establishing whether a dialed number went through successfully. U.S. Pat. No. 5,369,686, issued Nov. 29, 1994, to Dutra et al., discloses an elaborate computer based system for efficiently transferring digitally encoded messages over telephone lines. U.S. Pat. No. 5,432,844, issued Jul. 11, 1995, to Core et al., discloses a shared line telephone answering system. Japan Patent document No. 03-70386, published Mar. 26, 1991, discloses a call waiting visual indication device for multi-line telephone system. Japan Patent document No. 02-243042, published Sep. 27, 1990, discloses a telephone receptacle adapter allowing a multi-line receptacle type to function as an one line receptacle type by using a multi-color light emitting display. Japan Patent document No. 57-53175, published Mar. 30, 1982, discloses a device for identifying to a calling subscriber that absence transfer has been performed. German Patent document No. 3,014,440, published Oct. 22, 1981, discloses a PBX telephone with direct exchange calling keys having an optical indication to other stations when in use. Japan Patent document No. 56-73954, published Jun. 19, 1981, discloses an extension callout system in which an auxiliary telephone set of a multi-line telephone system accesses an incoming call to the called telephone set by dialing a specific sequence of numbers. WIPO Patent document No. 80/02094, published Oct. 2, 1980, discloses a telephone tracking system that allows a first telephone set to visually monitor other telephone sets by providing a light emitting indication when any of the other telephone sets makes a busy-idle transition.

None of the above inventions and patents, taken either singly or in combination, is seen to describe the instant invention as claimed.

SUMMARY OF THE INVENTION

Certain enterprises require maintained after hours telephone access, such as appliance repair services, automotive towing services, medical practitioners, etc. These enterprises generally employ a costly automated or human answering service, or a cellular telephone service for receiving after hours telephone calls, and passing the information to the enterprise personnel via direct call back or paging in predetermined order. In many instances, the telephones line may be improperly forwarded, or may not have been forwarded at all at the end of the workday. The results of such could mean loss of business, property, or even worse, life. Consequently, the present inventor provides an inexpensive and reliable device for acknowledging that the telephone line had been forwarded properly. Accordingly, it is a principal object of the invention to provide a call forwarding status monitor.

It is another object of the invention to provide a call forwarding status monitor that positively acknowledges the forwarding of the telephone line.

It is a further object of the invention to provide a call forwarding status monitor that visually acknowledges the forwarding of the telephone line.

Still another object of the invention is to provide a call forwarding status monitor that visually displays the dialed number forwarding the telephone line.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
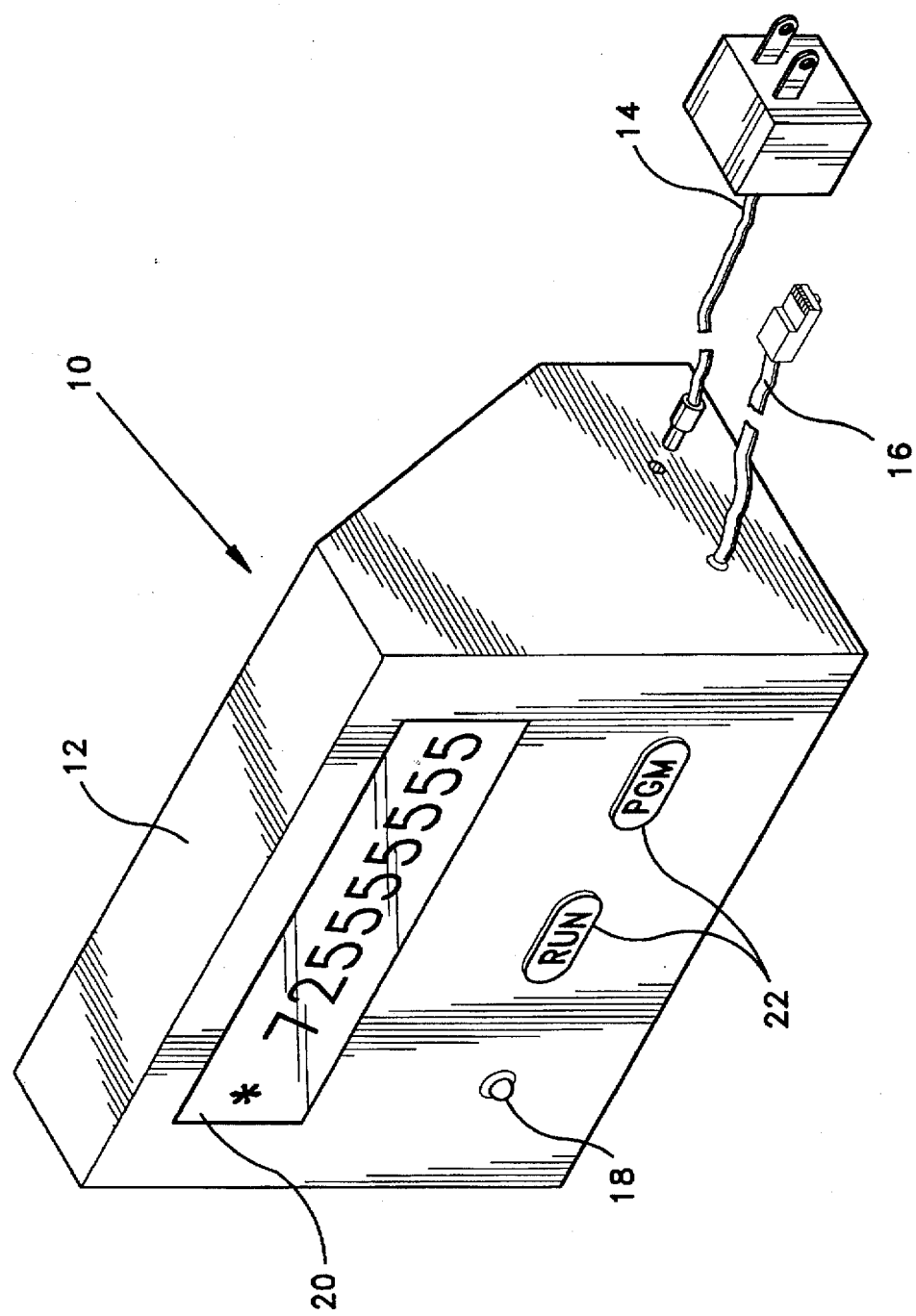
FIG. 1 is a perspective view of the monitoring unit of the present invention.

The present invention recognizes and monitors out going dialed telephone numbers for the intended purpose of identifying and acknowledging a call forwarded number. Referring to FIG. 1, the call forwarding status monitor is generally shown as 10. The monitor 10 has a housing 12 formed by conventional means. The housing 12 has a conventionally known power supply cord and plug 14 for connecting to a standard electrical outlet. Also, the housing 12 supports a telephone cord and male modular jack 16 for connecting to an available telephone female outlet. On the face of the housing 12 resides an visual indicator 18, typically an LED for visually indicating that the call forwarding sequence has been dialed. Additionally and/or optionally the face of the housing 12 has an alphanumeric visual display 20 for providing a readout of the dialed alphanumeric characters, allowing a positive acknowledgement of call forwarding status. The display 20 allows the user who forwards the telephone line to verify that the correct number had been entered for both the activation and de-activation of the call forwarding status monitor 10. The face of housing 12 provides a switch 22 accessible externally of the housing 12 to allow the user to program the internal circuitry establishing the proper dialing sequence for activation or de-activation of the telephone call forward feature. Generally, in most telephone communication services, "*72" followed by the number receiving the forwarded calls activates the call forwarding of the telephone line. Likewise, the de-activation sequence is "*73" without any other numbers. In some instances these dialing sequences may not be available; consequently, switch 22 provides a simple and convenient manner of reprogramming the proper sequences into the monitor 10.

The call forwarding status monitor 10 is used for monitoring and positively acknowledging the forwarding of a telephone line. In operation, the user simply plugs the telephone modular jack 16 into an available telephone outlet and plugs the power cord 14 into a standard electrical outlet. The monitor 10 is then ready for use. The user, at a telephone set dials the activation sequence "*72" followed by the telephone number. If the completed sequence matches the sequence in the unit, the visual indicator 18 will turn on and remain on until the de-activation sequence "*73" is entered at a telephone set. The monitor 10 reads the sequences as dialed from the telephone line without having to interfere or involve the servicing telephone company. Additionally, the dialed sequences may be displayed on the alphanumeric display 20. Once the dialed sequence is displayed, the user can visually identify whether or not the proper forwarding number has been entered. If an incorrect number has been entered, the user can quickly and efficiently de-activate the monitor 10 and redo the proper sequence.

Figure 2:
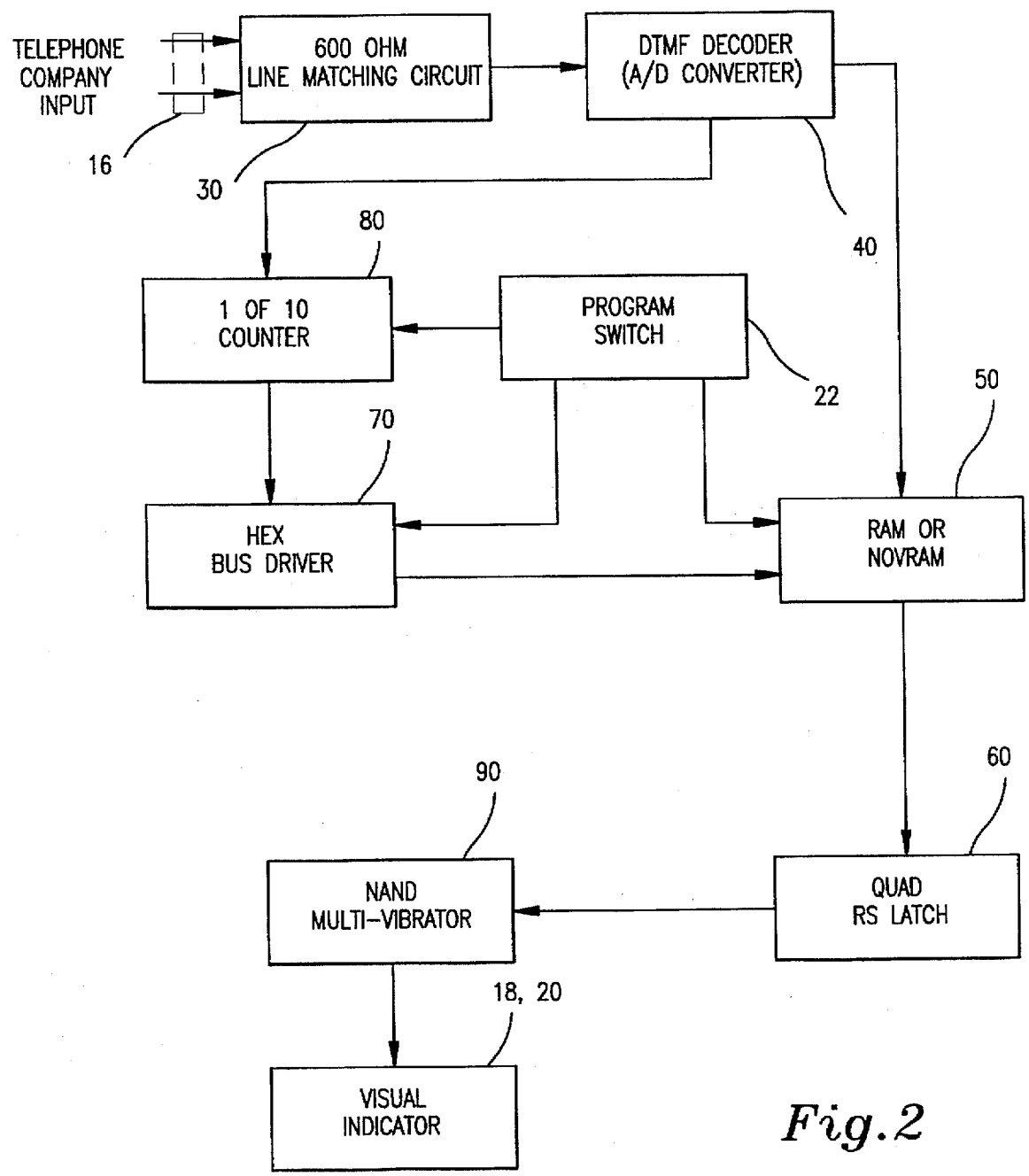
FIG. 2 is a block diagram of the operating components of the present invention.
Figure 3A:
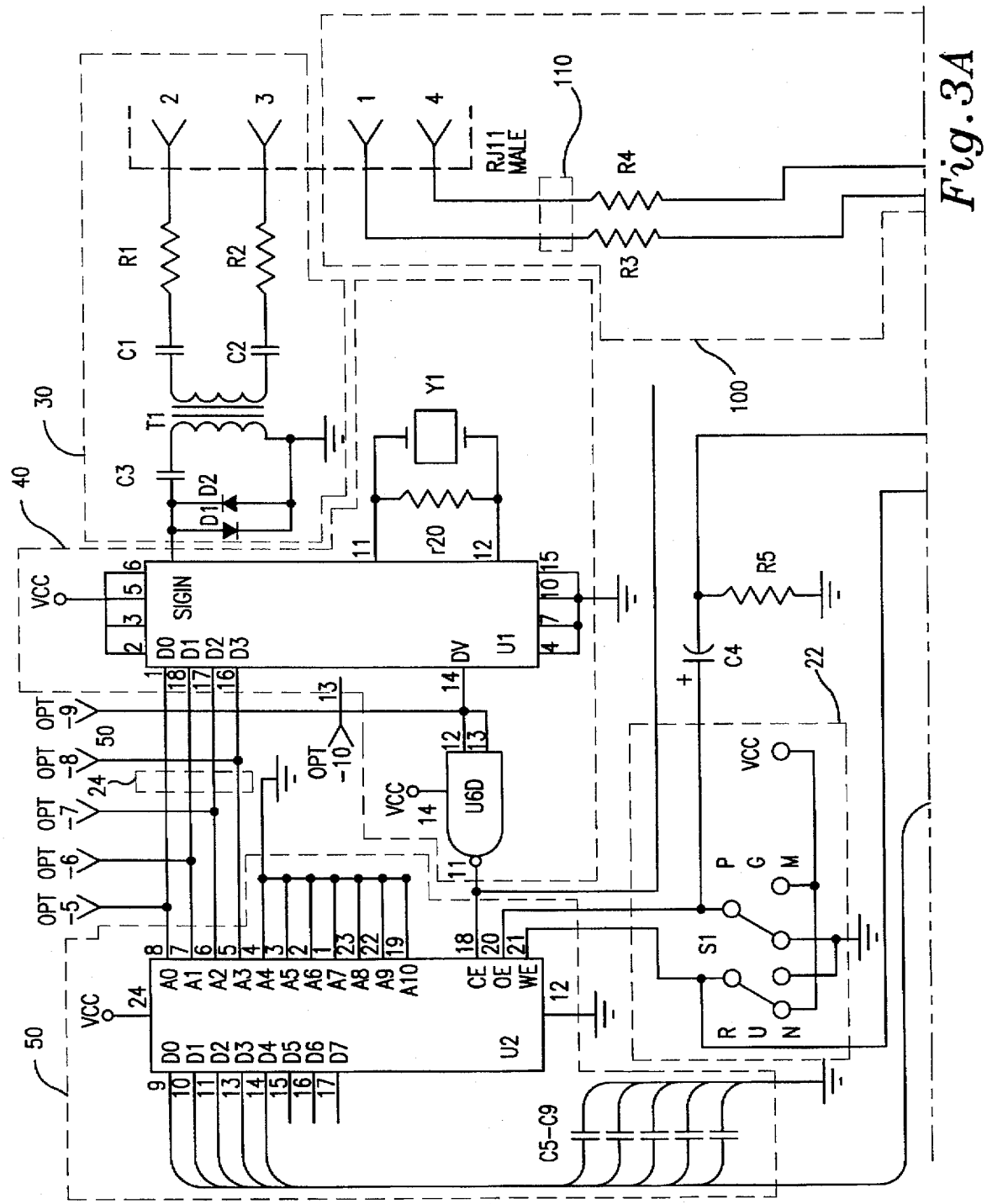
FIGS. 3A and 3B together show the schematic diagram of the electrical circuit of the invention.
Figure 3B:
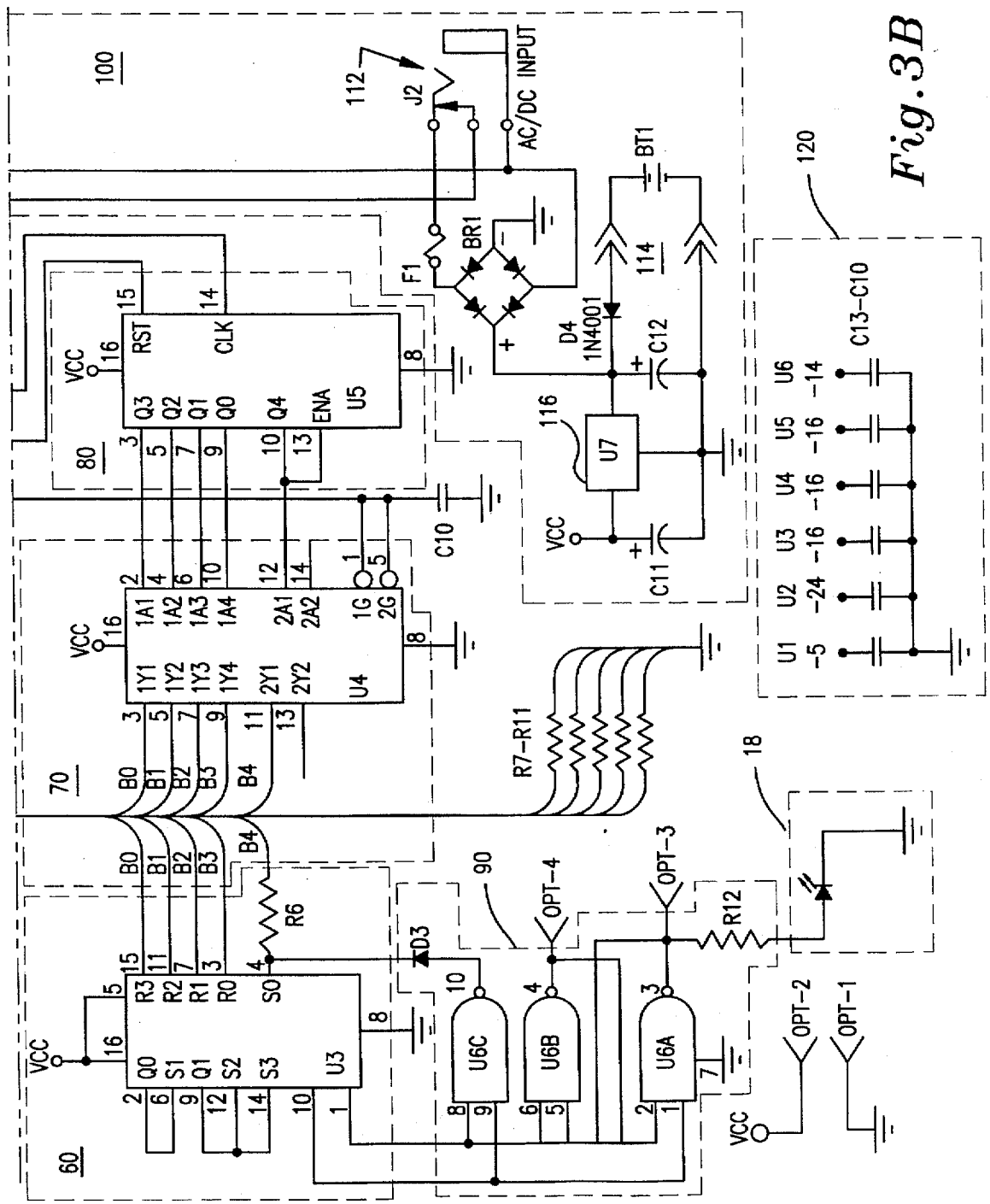

FIG. 2 is a block diagram representing the schematic diagram of FIGS. 3A and 3B. As can be seen from these figures, the monitor 10 is connected to the telephone company via the telephone line and modular connector 16. Internally of the housing 12 coupled to the cord 16 is a circuit 30 for impedance matching the monitor 10 to the telephone line. Circuit 30 consists of an isolation transformer T1. On the input side of the transformer T1 coupled to the telephone line are a pair of RC legs. Resistors R1 and R2 are approximately 3.3 KΩ each. Capacitors C1 and C2 are approximately 0.47 µF each. Resistor R1 and capacitor C1 are serially connected; likewise, resistor R2 and capacitor C2 are serially connected. Together these legs perform a telephone line voltage reduction and DC blocking at the input side of transformer T1. The output side of transformer T1 is coupled to another DC blocking capacitor C3, the signal present after the capacitor C3 is primarily the telephone set DTMF or touch tone signal. In order to avoid voltage surges or current spikes from interfering or damaging the monitor 10, a pair of diodes D1 and D2 are coupled in an anti-parallel voltage limiting relationship between the output of capacitor C3 and ground. From the impedance matching circuit 30 the signal is presented to a conventional dual-tone multifrequency (DTMF) decoder which detects and converts the analog DTMF or touch tone signal into a binary digital strobe. This conversion operates under the clocking control of a 3.57 Mhz crystal oscillator Y1. The output of the decoder 40 passes along as a four bit binary strobe, generally referred to as 24. The binary strobe 24 is fed to a memory module 50, typically a random access memory or a non-volatile random access memory (RAM OR NOVRAM), or during programming, to a 1 of 10 counter. The four bit binary strobe 24 output of the DTMF decoder 40 connects and selects four address line inputs of binary or hex code of the memory module 50. The four address line inputs of the RAM or NOVRAM 50 correlate at the output of the memory module 50 a control for a QUAD RS latch 60. The 1 of 10 counter 80 provides a setup of the forwarding dial numbers control in a proper cadence, thus allowing the sequence inputted by the dialing of an user to be properly monitored. The output of the counter 80 is coupled to a hex bus driver 70. The hex bus driver 70 maintains the output of the counter 80 effectively off-line unless reprogramming of the forwarding control sequence is needed.

The hex bus driver 70 operatively coupled, during programming, to the memory module 50 establishes the output status of the output of the memory. Upon receipt of the proper sequence of DTMF signals dialed by the user, namely "*72" plus a telephone number, to activate, or "*73" to de-activate the call forwarding of the telephone line, the QUAD RS latch 60 sets a multi-vibrator 90 which drives the indicator 18 (and/or 20) to visibly acknowledge the call forwarding status to a user. That is, "*72" plus number, indicator 18 turns on and/or display 20 displays the dial alphanumeric characters; while "*73" alone, indicator 18 turns off and/or display 20 displays the alphanumeric characters briefly and then extinguishes them. On the other hand, upon receipt of any other sequence of DTMF signals dialed by the user, the QUAD RS latch 60 resets the multi-vibrator 90, and consequently the indicator remains in a steady state.

When the call forwarding status monitor 10 of the present invention is utilized with a multi-line telephone service in lieu of a direct telephone line, the user can establish the protocol or dialing sequence identified by the service. To accomplish this the monitor 10 has switch 22 that allows the user to reprogram the monitor 10 to recognized any sequence of DTMF signals as the call forwarding activation or de-activation. The switch 22 is a basic single pole-double throw switch that toggles between two operative positions. Alternatively, any switch (i.e., mechanical, electronic, etc.) capable of supporting this function is suitable. This is done simply by toggling the switch position to the program mode (PGM), and inputting the user defined sequence for the activation and de-activation. Upon completion of the reprogramming of the monitor 10, the switch 22 is toggled back to the ready or run mode (RUN). In the schematic diagram of FIGS. 3A and 3B, numerous optional terminals are present, generally referred to as OPT-1 through OPT-10. These terminals provide immediate access to the circuitry to allow the monitor 10 to be accommodated by other types of telephone systems and/or to improve the functionality of the device without departing from the scope and content of the present disclosure. Particularly, display 20 is controlled by a conventionally known alphanumeric driving circuit (not shown); however, the output of the multi-vibrator 90 providing the driving signals are shown as OPT-3 and OPT-4. Supplying power to the circuitry is a power supply circuit 100. The power supply circuit 100 provides power to the circuit components in three basic and conventionally known manners. First, in a four wire-two line telephone system using the RJ-11 modular jack connection, the monitor 10 accesses two of the wires for the subscriber line. The other two wires 110 are present but not used unless there is an additional telephone subscriber line provided at the telephone set location. The other two wires 110, when not used as a second subscriber line, provide a DC voltage provided by the telephone company. Second, the power cord and plug 14 are conventionally coupled via a standard AC/DC adapter input jack 112 to the monitor 10. Both the wires 110 and the jack 112 are coupled to full wave rectifier bridge circuit BR1 across a 100 mA fuse F1. The rectifier circuit BR1 produces a mono-polar voltage and is coupled to a smoothing capacitor C12, and to a voltage regulator 116. Third, the power supply 100 also has a battery 114 for establishing the necessary steady state voltage in order to maintain the active circuit components during a power down or power outage. The output of voltage regulator 116 produces a voltage Vcc which provides steady state DC voltage to operate the various circuit components of the monitor 10. An additional smoothing capacitor C11 is presented in parallel across the voltage regulator 116 output for maintaining a constant and smooth Vcc. Also, a filter network 120 is used to help protect the electronic circuitry of monitor 10. The filter network provides a path for stray or fluctuating voltages to ground, eliminating the erroneous readings of the dialed numbers.

Figure 4A:
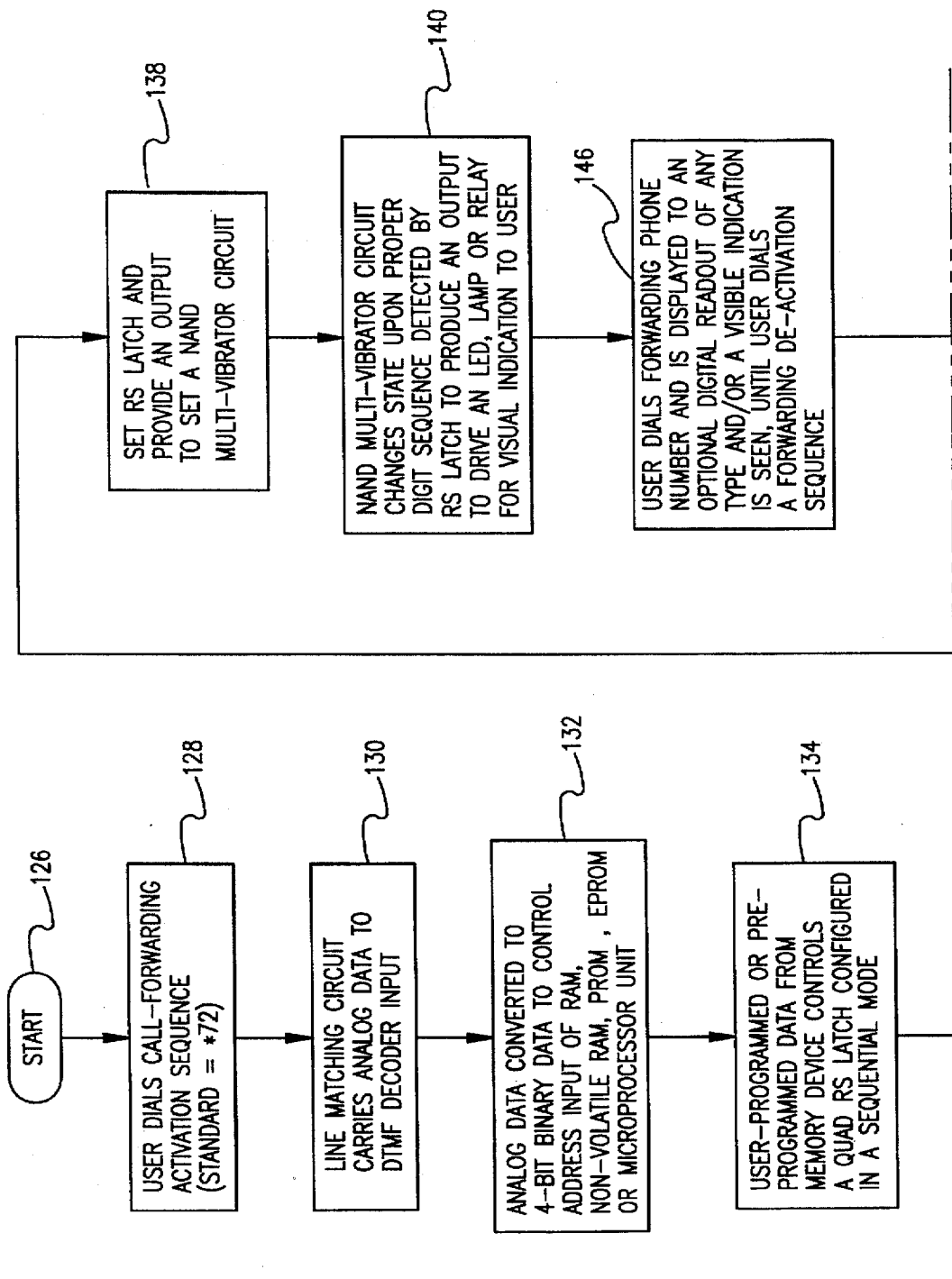
FIGS. 4A and 4B together show a flow chart diagram of the monitoring function of the present invention.
Figure 4B:
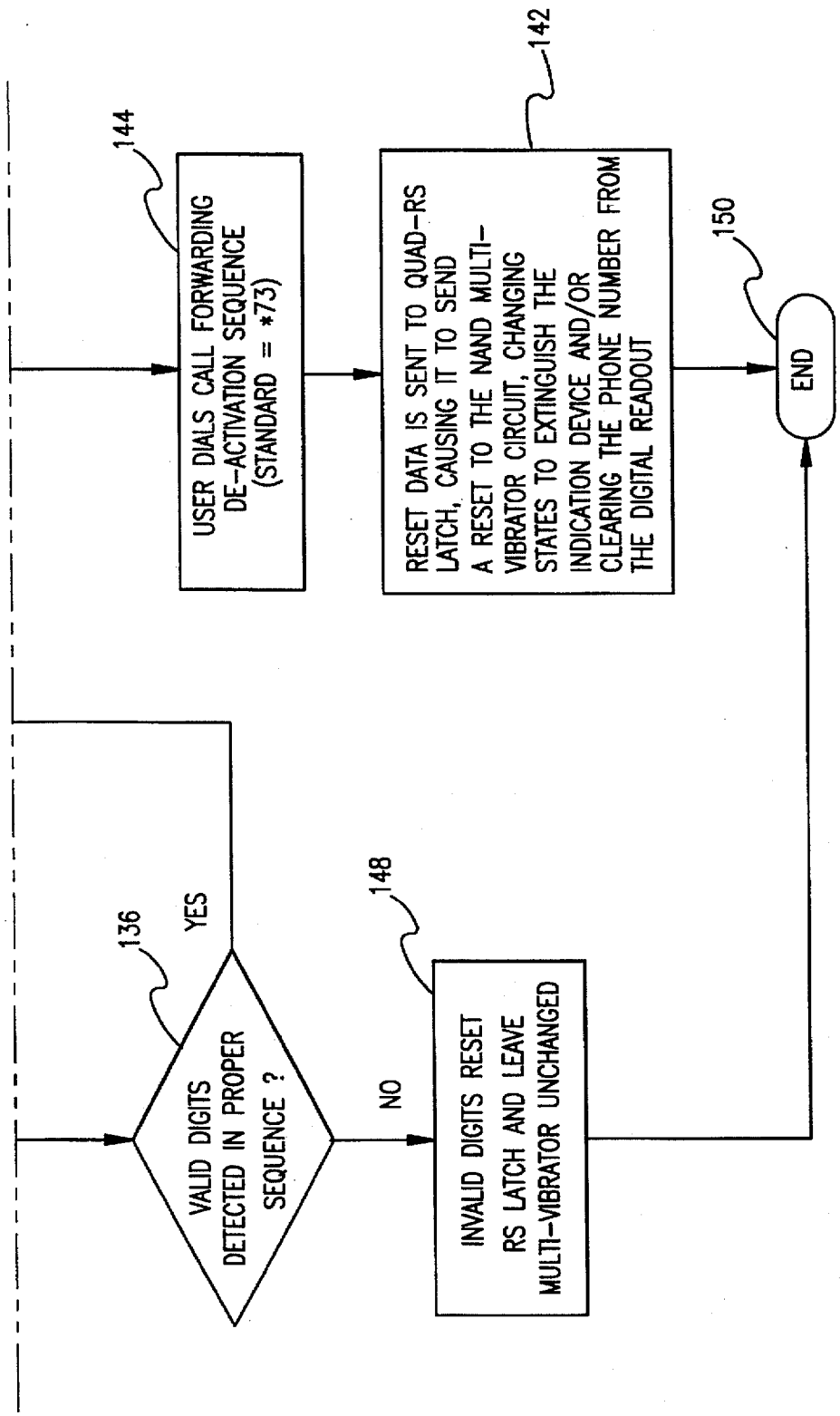

The flow chart diagram shown in FIGS. 4A and 4B present a clear and understandable representation of the operation of the call forwarding status monitor 10 of the present invention. Beginning at the start 126, the user dials a number, particularly a call forwarding activation (*72 standard) plus a telephone number 128. The line matching circuit 30 carries the analog signal to the DTMF decoder 40, represented by block 130. Block 132 represents the transfer of the converted analog signal, the four bit binary strobe 24 to the memory module 50. The block 134 uses, in program mode, the counter 80, the hex bus driver 70, or in run mode, the memory module 50 to establish the sequence in proper order to control the QUAD RS latch 60. Upon receipt of the control signal, Quad RS latch 60 answers decision block 136, if an improper sequence of numbers has been dialed the state of the indicator remains unchanged and the monitor 10 is reset to the end block 150, awaiting the next dialing sequence. If a valid activation or de-activation sequence is present then from block 138, the QUAD RS latch would latch the sequence and set the multi-vibrator 90, which changes the state of the indicator 18, 20 as seen by blocks 140 and 146. Blocks 142, and 144 establish the de-activation of the call forwarding status monitor 10, thereby extinguishing the indicator 18 and/or clearing the display 20.

Although the call forwarding status monitor disclosed herein is single stand alone unit, it is apparent that modification of the circuit providing a audible indication is within the scope of the invention. In addition, further circuit modifications incorporating the monitor into current telephone devices displaying auto-dial or caller ID information, for example, are also within the scope of the invention. Likewise, the indication that a telephone line has been call forwarded, as set forth by this invention, can be obtained from any or all telephone companies by supplying service to a telephone set of a business or residence. The service may include a recording acknowledging activation or de-activation, transmitting data to a decoding device at the location of the telephone set (such as adding this invention to a caller ID device), or generating a specific ringer sequence as an audible indication.

Further, the call forwarding status monitor can also be obtained by CPU/software manipulation in an existing telephone multi-line switching circuit. More specifically, the call forwarding status monitor can be designed into control software or presented as a card in multi-extension, multi-line telephone systems to provide activation/de-activation indication of any form to all or selected telephone set extensions operating from a central control unit. In this environment anyone forwarding the telephone line would have immediate acknowledgement of the forwarding operation as well as all of the other telephones in the system. The call forwarding status monitor of the present invention can use telephone companies' call forwarding access sequence or if the control unit has a peculiar sequence, the present monitor can be programmed to fit the need.

It is to be understood that the present invention is not limited to the sole embodiment described above, but encompasses any and all embodiments within the scope of the following claims.

I claim:

1. A device for monitoring the call forwarding status of a telephone line comprising:

a housing;

first connection means extending from said housing for connecting said housing to the telephone line;

second connection means extending from said housing for supplying electrical power to said housing;

a decoder, having an input and an output, coupled to said first connection means for conveying touch tone signals at said input into binary codes at said output;

memory means coupled to said output of said decoder, for receiving the binary codes, said binary codes selecting address locations of said memory means, and accessing said address locations in a sequence based upon the touch tone signals;

latch means responsive to said memory means for latching a proper sequence of accessed address location sequences from said binary codes;

indication means responsive to said latch means for indicating when the proper sequence of said address locations has been accessed;

a switch for selectively overriding a preset sequence to establish alternative dialing sequences for activation and de-activation;

counter means for setting dial numbers in proper cadence; and a hex bus driving means for maintaining output of said counter means off-line unless reprogramming of the forwarding control sequence is initiated.

2. The device according to claim 1, further comprising a multi-vibrator responsive to the latch means for changing the state of the indication means.

3. The device according to claim 1, further comprising alphanumeric display means for providing readout of dialed alphanumeric characters.

* * * * *